United States Patent [19]

Sbuelz

[11] 4,383,313

[45] May 10, 1983

[54] TONE GENERATOR FOR PAM/TDM TELECOMMUNICATION SYSTEM

[75] Inventor: Anes Sbuelz, Milan, Italy

[73] Assignee: Italtel Societa Italiana Telecommunicazioni S.p.A., Milan, Italy

[21] Appl. No.: 238,575

[22] Filed: Feb. 26, 1981

[30] Foreign Application Priority Data

Feb. 29, 1980 [IT] Italy .................................. 20253A/80

[51] Int. Cl.³ ............................................. H04J 3/20
[52] U.S. Cl. ...................................... 370/51; 330/263
[58] Field of Search ................. 370/6, 51, 52, 58, 77, 370/110.1, 110.2, 110.4; 330/262, 263, 275; 331/108 A, 114

[56] References Cited

U.S. PATENT DOCUMENTS 2,791,644  5/1957  Sziklai .............................. 330/263
3,588,366  6/1971  Formenti et al. ..................... 370/51

Primary Examiner—Benedict V. Safourek
Attorney, Agent, or Firm—Karl F. Ross

[57] ABSTRACT

A tone generator for a telecommunication—especially telephone—system operating in the PAM/TDM mode comprises two complementary transistors with interconnected emitters joined to a "hot" conductor of a two-wire transmission path forming part of a trunk line between two groups of subscribers, the collectors of these transistors being connected through respective series resistors to a positive and a negative terminal of a DC source. These collectors are further coupled via respective shunt condensers to the "cold" conductor of the transmission path which is grounded through a low-ohmic further resistor. A local oscillator supplies a sinusoidal voltage wave through an operational amplifier to the interconnected bases of the two transistors whereby one or the other transistor conducts upon simultaneous closure, during a time slot assigned to a called subscriber, of a trunk switch at the near end and of a line switch at the far end of the transmission path enabling the resonant discharge of one of the previously charged shunt condensers into a remote line capacitor. Residual energy remaining stored on the parasitic capacitance of the two conductors is dissipated in a subsequent guard interval, upon the reopening of the two switches, as the partly discharged shunt condenser is recharged through the grounding resistor.

4 Claims, 3 Drawing Figures

TONE GENERATOR FOR PAM/TDM TELECOMMUNICATION SYSTEM

FIELD OF THE INVENTION

My present invention relates to a tone generator for a telephone or other telecommunication system operating with pulse-amplitude modulation (PAM) in a time-division-multiplex (TDM) mode.

BACKGROUND OF THE INVENTION

A PAM/TDM telecommunication system of the type here contemplated has been disclosed in commonly owned U.S. Pat. Nos. 3,499,119 and 3,588,366. In such a system, two groups of two-wire subscriber lines at opposite ends of a common trunk line are connectable to the latter by sequentially operated electronic gating switches during respective time slots of a recurrent frame period whereby a calling and a called subscriber line respectively included in these groups may intercommunicate with each other during an assigned time slot. Each subscriber line has a storage condenser or capacitor connected across its wires which, upon closure of the associated gating switch, form extensions of a high-voltage or "hot" conductor and a neutral or "cold" conductor of the common trunk line, the latter conductor being usually grounded. The "hot" conductor, actually, has two branches serving for signal transmission in opposite directions. With the aid of suitable impedance elements in series with this "hot" conductor, signal samples stored on a condenser of one subscriber line are transmitted by resonant transfer, during the assigned time slot, to the condenser of the subscriber line paired therewith.

U.S. Pat. No. 3,588,366 also discloses a tone generator in the form of an audiofrequency oscillator working into two serially interconnected transistors of mutually opposite conductivity types which charge a capacitor with samples of positive or negative half-cycles of a sine-wave, these samples being transferable by a gating switch to the trunk and thence to the storage condenser of a subscriber line served by the exchange in which that generator is located. The wave samples thus transferred are integrated on their way to the subscriber station for which they are intended and, in dependence upon a characteristic modulation imparted to the oscillator output at the exchange, are perceived as a calling, line-release, busy or dial-tone signal by the subscriber.

Residual energy stored in the trunk line tends to give rise to crosstalk between subscribers assigned consecutive time slots. It is customary to separate sampling intervals occupying part of these time slots by intervening guard intervals during which capacitively stored energy is discharged; see, for example, commonly owned U.S. Pat. No. 3,624,304. As noted in my copending application Ser. No. 234,805, filed Feb. 17, 1981, now U.S. Pat. No. 4,340,788, residual energy is also stored electromagnetically in a transmission path such as a trunk line on account of the inherent inductance of its conductors. This so-called longitudinal component of crosstalk can be minimized with the aid of suitable conductor structures, described in commonly owned U.S. Pat. Nos. 3,878,485 and 3,973,227, which use coaxial layers formed by thin foils whose thickness is less than the penetration depth of the high-frequency current pulses transmitted over the line. Such a structure, on the other hand, tends to increase the line resistance and thus makes it more difficult to dissipate the capacitively stored residual energy giving rise to the so-called transverse crosstalk component.

Thus, a sine-wave sample transmitted in one time slot to a subscriber may leave a residue which in the next time slot could be superimposed on a voice sample destined for another subscriber.

OBJECT OF THE INVENTION

The object of my present invention, therefore, is to provide means in a tone generator of a PAM/TDM telecommunication system for substantially suppressing transverse crosstalk components as discussed above.

SUMMARY OF THE INVENTION

A tone generator according to my invention comprises a source of alternating voltage, such as a sine-wave oscillator followed by an operational amplifier, whose output is connected in parallel to a pair of mutually complementary transistors in a manner similar to that described in U.S. Pat. No. 3,588,366 but with the important difference that their collectors, connected to a positive and a negative terminal of a DC source by way of respective series resistors, are capacitively coupled via respective shunt condensers to the neutral conductor of an associated transmission path—generally forming one half of a two-way trunk line—whose high-voltage or "hot" conductor is connectable to the interconnected emitters of the transistors by switch means synchronized with gating means establishing temporary connections during respective time slots between subscriber lines at opposite ends of that path. The neutral or "cold" conductor, furthermore, is grounded through a low-ohmic third resistor whereby one of the two shunt condensers of the tone generator, partly discharged during a transmitting interval into the storage capacitor of a selected subscriber line, is recharged during a subsequent guard interval through the corresponding collector resistor and the third resistor to cancel a residual charge stored on a parasitic capacitance of the transmission path. (For the sake of simplicity, only one transmitting direction of a trunk will be discussed hereinafter.)

BRIEF DESCRIPTION OF THE DRAWING

The above and other features of my present invention will now be described in detail with reference to the accompanying drawing in which.

SPECIFIC DESCRIPTION

Figure 1:
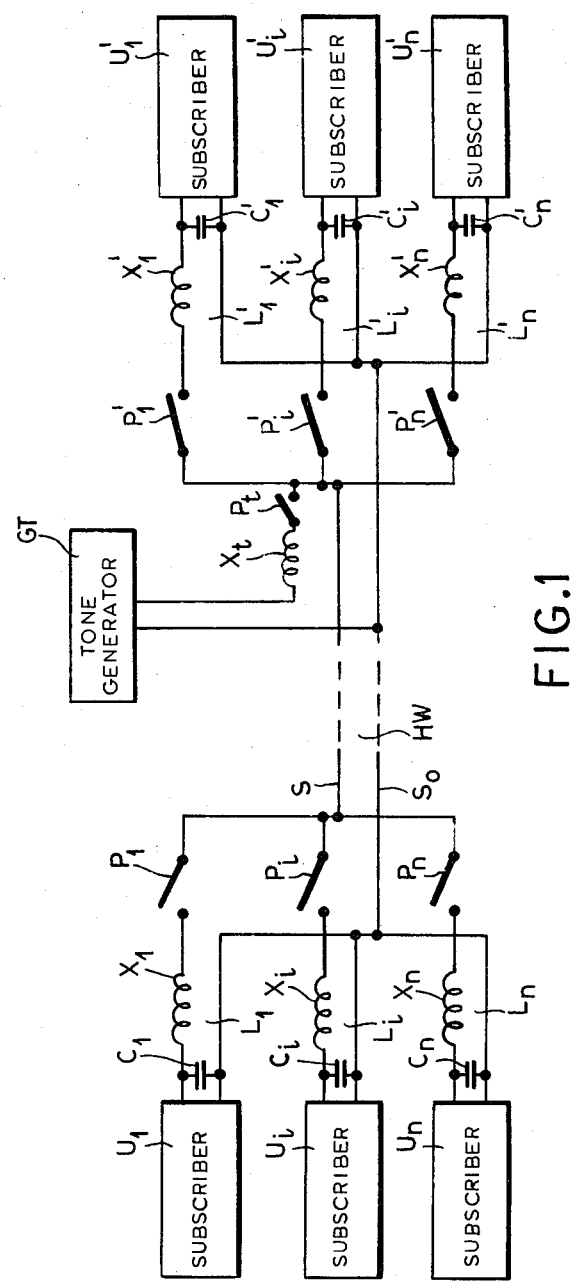
FIG. 1 diagrammatically shows the overall layout of a PAM/TDM telecommunication system to which my invention is applicable.

FIG. 1 is an overview of a telephone system generally similar to that disclosed in the aforementioned commonly owned U.S. Pat. Nos. 3,588,366 and 3,499,119. The system comprises a trunk line HW for the transmission of voice samples between a first group of lines $L_I \ldots L_i \ldots L_n$, serving subscriber stations $U_I \ldots U_i \ldots U_n$, and a second group of lines $L_1' \ldots L_i' \ldots L_n'$, serving subscriber stations $U_I' \ldots U_i' \ldots U_n'$. Each subscriber line has two wires with a storage capacitor $C_I \ldots C_i \ldots C_n$ or $C_1' \ldots C_i' \ldots C_n'$ connected thereacross and an inductor $X_I \ldots X_i \ldots X_n$ or $X_1' \ldots X_i' \ldots X_n'$ in series with its active wire. Trunk HW comprises a neutral conductor $S_O$ and a high-voltage conductor S for transmission from left to right, i.e. from subscriber lines $L_1-L_n$ to subscriber lines $L_1'-L_n'$. A transmission path carrying signals in the opposite direction includes the common conductor $S_O$ and another high-voltage conductor which has not been illustrated.

The neutral wires of the several subscriber lines are directly connected to "cold" conductor $S_O$ while their active wires are selectively connectable, during respective time slots, to the "hot" conductor S by respective gating switches $P_1 \ldots P_i \ldots P_n$ or $P_1' \ldots P_i' \ldots P_n'$ of the electronic type which are part of a pair of exchanges, not further illustrated, serving the two subscriber groups. Each of these exchanges also includes a tone generator GT for sending out any of the aforementioned signals to the subscribers of the local group, only one such tone generator having been illustrated. This generator has one output lead directly tied to "cold" conductor $S_O$ and another output lead in series with an inductor $X_t$ connectable to "hot" conductor S by an electronic trunk switch $P_t$ closed during a time slot in which a sine-wave sample is to be transmitted to a subscriber concurrently connected to trunk HW by its line switch $P_1'-P_n'$.

Figure 2:
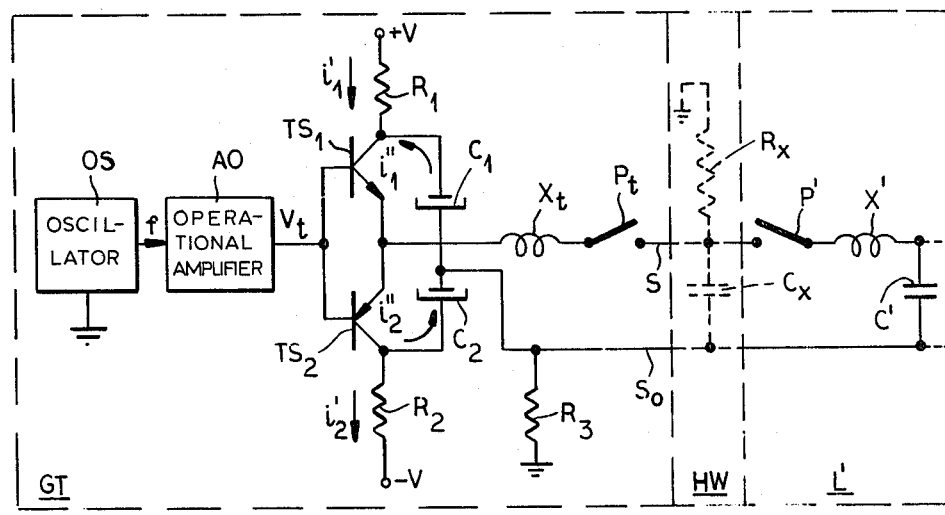
FIG. 2 shows details of a tone generator according to my invention included in the system of FIG. 1.

Tone generator GT, more fully illustrated in FIG. 2, comprises an oscillator OS which delivers a sine wave f balanced with respect to ground, to an operational amplifier AO. A balanced alternating voltage $V_t$ appears in the output of amplifier AO and is applied in parallel to the bases of two complementary transistors connected in series between a source of direct current having a positive terminal $+V$ and a negative terminal $-V$, namely an NPN transistor $TS_1$ and a PNP transistor $TS_2$. The collectors of transistors $TS_1$ and $TS_2$ are connected to positive potential $+V$ and negative potential $-V$ by way of respective series resistors $R_1$ and $R_2$ and are coupled through respective shunt condensers $C_1$ and $C_2$ to the neutral conductor $S_O$ of trunk line HW which is grounded via a low-ohmic resistor $R_3$. The junction of the interconnected emitters of these transistors is connectable by way of inductor $X_t$ and trunk switch $P_t$ to the high-voltage conductor S which, in FIG. 2, is shown connectable by another switch P' and an inductor X' to a generic subscriber line L' whose active and neutral wires are bridged by a storage capacitor C'. Also indicated in FIG. 2 is a parasitic capacitance $C_x$ between conductors S and $S_O$ as well as a leakage resistance $R_x$ present between conductor S and ground.

Figure 3:
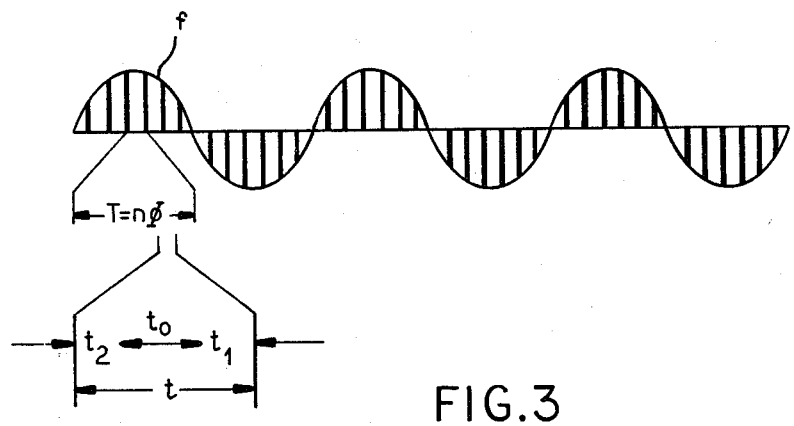
FIG. 3 is a graph relating to the operation of the tone generator of FIG. 2.

Sine wave f, whose frequency may be 400 Hz, is shown in FIG. 3 as having a half-cycle spanning a multiplicity of frame periods T each encompassing a number n of time slots or phases $\Phi$, e.g. with n = 100. Each time slot has a duration t and is subdivided into a sampling interval $t_0$ flanked by halves $t_1$ and $t_2$ of respective guard intervals separating the sampling intervals of adjacent time slots. Any of the switches shown in FIGS. 1 and 2 is closed only during a sampling interval $t_0$ whose length may be 300 ns as described in U.S. Pat. No. 3,588,366. Capacitor C' of FIG. 2, which of course is representative of any line capacitor $C_1'-C_n'$ in FIG. 1, is not charged by voice currents from the associated subscriber when signals are to be transmitted to line L' from tone generator GT.

When switches $P_t$ and P' are concurrently closed during the sampling interval of a time slot $\Phi$ assigned to line L', transistor $TS_1$ conducts during a positive half-cycle of wave f whereas transistor $TS_2$ conducts during a negative half-cycle. With transistor $TS_1$ conducting, line capacitor C' will be charged positive by two current components $i_1'$ and $i_1''$ traversing that transistor. Current $i_1'$ passes from positive terminal $+V$ through collector resistor $R_1$, inductor $X_t$, conductor S and inductor X' into capacitor C' and thence via conductor $S_O$ and resistor $R_3$ to ground. Current $i_1''$ flows from condenser $C_1'$, charged during the preceding guard internal, via inductors $X_t$, X' and conductor S into capacitor C' and returns to condenser $C_1$ by way of conductor $S_O$. Upon removing of switch $P_t$ at the end of sampling interval $t_0$, condenser $C_1$ is recharged from terminal $+V$ by way of collector resistor $R_1$ and grounding resistor $R_3$ so that the same operation can be repeated if switch $P_t$ is again closed in the immediately following time slot to send a tone signal to another subscriber.

In an analogous manner, conduction of transistor $TS_2$ causes capacitor C' to be charged negative by two current components $i_2'$ and $i_2''$.

Parasitic capacitance $C_x$ is in parallel with line capacitor C' and thus retains a residual charge of the same polarity when switches $P_t$ and P' are reopened. The subsequent recharging of condenser $C_1$ (or $C_2$), however, results in a reverse charging of capacitance $C_x$ by a small current passing through this capacitance and leakage resistance $R_x$ which lie in parallel with resistor $R_3$. By a suitable dimensioning of this resistor, whose magnitude will generally be on the order of a few tens of ohms, the residual charge can be substantially dissipated with the aid of the voltage drop developed thereacross so that the previously transmitted sine-wave sample does not affect a voice sample sent over trunk line HW in the next time slot.

I claim:

1. In a PAM/TDM telecommunication system wherein a transmission path including a high-voltage conductor and a neutral conductor extends between two groups of two-wire subscriber lines and is provided at each end with selectively operable gating means for establishing temporary connections during respective time slots between subscriber lines of said groups, an active wire of each subscriber line being connectable by said gating means to the high-voltage conductor of said transmission path, each subscriber line having a storage capacitor connected across the wires thereof, the combination therewith of a tone generator comprising:

a source of alternating voltage balanced with respect to ground;

a supply of direct current with a positive terminal and a negative terminal;

a pair of serially interconnected transistors of mutually opposite conductivity types with bases connected in parallel to said source, emitters jointly connectable to said high-voltage conductor, and collectors connected to said positive and negative terminals by way of respective series resistors;

two shunt condensers respectively inserted between said collectors and said neutral conductor;

a low-ohmic third resistor inserted between said neutral conductor and ground; and switch means synchronized with said gating means inserted between said emitters and said high-voltage conductor for periodically connecting one of said shunt condensers, determined by the instant polarity of said alternating voltage, via the collector and the emitter of a conductive transistor of said pair across said conductors for partial discharge into said storage capacitor of a selected subscriber line of one of said groups, said switch means and gating means disconnecting said high-voltage conductor from said emitters and from the active wire of the selected subscriber line during a subsequent guard interval with resulting cutoff of said conductive transistor whereby said one of said shunt condensers is recharged through the corresponding series resistor and said third resistor to generate a voltage drop across said third resistor for dissipating a residual charge stored on a parasitic capacitance of said conductors.

2. The combination defined in claim 1 wherein said source comprises a sine-wave oscillator followed by an operational amplifier.

3. The combination defined in claim 1 or 2, further comprising inductance means in series with said high-voltage conductor for charging said storage capacitor of the selected subscriber line from said one of said shunt condensers by resonant transfer.

4. The combination defined in claim 3 wherein said inductance means comprises a common inductor between said emitters and said switch means and individual inductors between said gating means and said storage capacitor of each subscriber line of said one of said groups.

* * * * *